(No Model.)

L. KUHN.
CANDY.

No. 426,506. Patented Apr. 29, 1890.

Witnesses.
O. H. Keeney.
Anna Faust.

Inventor.
Louis Kuhn
By Ermin & Benedict
Attorneys.

UNITED STATES PATENT OFFICE.

LOUIS KUHN, OF MILWAUKEE, WISCONSIN.

CANDY.

SPECIFICATION forming part of Letters Patent No. 426,506, dated April 29, 1890.

Application filed November 4, 1889. Serial No. 329,157. (No specimens.)

*To all whom it may concern:*

Be it known that I, LOUIS KUHN, of Milwaukee, in the county of Milwaukee and State of Wisconsin, have invented new and useful Improvements in Candy; and I do hereby declare the following to be a full, clear, and exact description of said invention, reference being had to the accompanying drawings, and to the letters of reference marked thereon, which form a part of this specification.

In the manufacture of certain kinds of candy it is found desirable to use some glucose with the sugar, the glucose serving, among other things, as a substitute for an acid or similar element, such as has heretofore been used to secure the proper granulating or consistency of the material of which the candy is formed. If glucose is used in excess in the material and enters into the candy in such form as to be exposed to the action of the atmosphere, the result is disastrous to the proper quality of the candy, as it is almost sure to change into a fluid or semi-liquid form in a comparatively short time. To obviate this undesirable quality of candy containing glucose is the object of my improved process, in which I construct candy containing sugar and glucose in two parts—an interior or body portion containing a large percentage of glucose and a shell or case in which glucose enters to only a small extent.

Figure 1:
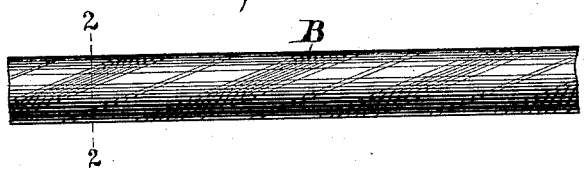
Figure 2:
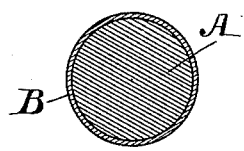
Figure 3:
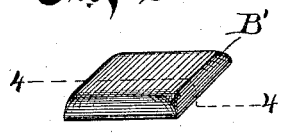
Figure 4:
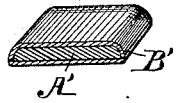

In the drawings, Figure 1 represents a stick of my improved candy. Fig. 2 is a transverse section of the stick of candy shown in Fig. 1 on line 2 2 thereof. Fig. 3 is a perspective view of a block or modified form of my improved candy. Fig. 4 is a similar view of a part of the same block or square of candy shown in Fig. 3, one end being in vertical transverse section on line 4 4 of Fig. 3.

My process of manufacturing candy consists in taking about thirty pounds of sugar and ten pounds or more of glucose and putting these ingredients into sufficient water to dissolve them. The solution or sirup thus formed is put into a kettle or proper receptacle therefor, and is then heated to a temperature of about 300° Fahrenheit, and the mass is then poured out on a marble slab or other cooling-table, where it remains until hard enough to be formed into sticks, blocks, or other shapes. The material thus formed is used for the interior or body part of the candy. This material, containing about one-third its weight of glucose, although it will very soon harden and become rigid, yet if left exposed to the atmosphere will in a comparatively short time soften and become fluid or semi-liquid, so as not to retain the form or shape into which it may have been molded. To overcome such change of quality in the body of the candy formed of this material, I form a covering or shell for the candy by taking about twenty pounds of sugar and three pounds of glucose and put these materials in sufficient water to dissolve them, and put the sirup thus formed into a kettle and heat it to a temperature of about 300°, then pour it on a marble slab or other cooler, and when sufficiently cool for manipulation use this last-formed material as an envelope or covering for the first-formed material, putting this last-formed mass about the first-formed material in such manner as is common with confectioners for enveloping one mass of material with another material when being formed into candy, and then draw the candy out and cut it off in sticks, as shown in Fig. 1, in which form there will be the body part A and the enveloping part B, as shown in Fig. 2. In this way the interior or body part A is formed of glucose and sugar, the glucose being in proportion to the sugar as one to three, and in the outside or shell B of the candy the glucose will be in proportion to the sugar as three to twenty. In this manner candy is formed in which the interior part will for a very long time remain in a fresh but rigid condition, and the shell will be sufficiently hard and compact to resist the action of the atmosphere on the body part, while at the same time the small amount of glucose in the shell will keep the surface fresh, instead of permitting it to become dry and liable to crumble, as it would do if composed of sugar only.

Figs. 3 and 4 show modified forms of candy, in which the same general features of construction are observed, the interior or body part A' being made of material containing glucose and sugar in the proportion of one to three, while the shell B' contains sugar and glucose in the proportion of three to twenty.

I do not wish to confine myself to the exact proportions of one to three and three to twenty for the glucose and sugar in the two qualities of material of which the candy is formed, for these proportions might be varied slightly without material difference in the quality of the candy produced; but these proportions are the most desirable for use, and they should be observed as nearly as possible.

The foregoing description and proportions are made with reference to the use of what are termed "standard A sugars." If higher-grade sugars are used, the material for the body part of the candy may be composed of a greater proportion of glucose, even equaling one of glucose to one of sugar, the especial object of my invention being to provide a case or shell which, while it remains fresh on the outside, will at the same time protect and support a body having a large percentage of glucose.

What I claim as new, and desire to secure by Letters Patent, is—

1. As an article of manufacture, candy formed in two parts, an interior or body part formed of glucose and sugar in about the proportions of one of glucose to three of sugar, and a shell or case upon and enveloping the body part of the candy formed of glucose and sugar in about the proportions of three parts of glucose to twenty parts of sugar, substantially as described.

2. As an article of manufacture, candy formed in two parts, an exterior part or case containing glucose and sugar in the proportion of three parts of glucose to twenty parts of sugar, and an interior or body part formed of sugar and glucose, in which the glucose is in much larger proportion to the sugar than it is in the exterior or case of the candy, substantially as described.

In testimony whereof I affix my signature in presence of two witnesses.

LOUIS KUHN.

Witnesses:
   C. T. BENEDICT,
   JOHN GESSER.